G. BROWNING.
COMPUTING MACHINE.
APPLICATION FILED MAR. 9, 1914.

1,208,742.

Patented Dec. 19, 1916.
8 SHEETS—SHEET 1.

G. BROWNING.
COMPUTING MACHINE.
APPLICATION FILED MAR. 9, 1914.

1,208,742.

Patented Dec. 19, 1916.
8 SHEETS—SHEET 4.

G. BROWNING.
COMPUTING MACHINE.
APPLICATION FILED MAR. 9, 1914.

1,208,742.

Patented Dec. 19, 1916.
8 SHEETS—SHEET 8.

Witnesses:

Inventor
George Browning

UNITED STATES PATENT OFFICE.

GEORGE BROWNING, OF CHICAGO, ILLINOIS.

COMPUTING-MACHINE.

1,208,742.　　　　Specification of Letters Patent.　　Patented Dec. 19, 1916.

Application filed March 9, 1914. Serial No. 823,569.

*To all whom it may concern:*

Be it known that I, GEORGE BROWNING, a subject of the King of England, residing at Chicago, in the county of Cook and State of Illinois, have invented certain new and useful Improvements in Computing-Machines, of which the following is a description.

My invention relates to that general class of devices known as adding or calculating machines, which by the manipulation of appropriate keys or levers perform certain mathematical computations.

The object of my invention is to produce a machine in which, when the desired key is depressed it is locked by its first movement to the carriage so that further pressure upon the key depresses the carriage after which the key may be released and both the key and the carriage will be held in their depressed position.

Another object is the provision of an indicator actuating mechanism which is normally disconnected when the key is in its raised position, but the downward movement of the key causes the mechanism associated therewith to directly connect the same with the actuating mechanism and cause the operation of the desired indicator.

Another object is to produce a means for limiting the successive movements of the carriage and a common actuating means associated with the several keys to move the limiting means into operative position.

To this end my invention consists in the novel construction, arrangement and combination of parts herein shown and described and more particularly pointed out in the claims.

In the accompanying drawings wherein like or similar reference characters indicate like or corresponding parts: Fig. 5 is a section taken substantially on line 5—5 of Fig. 6.

In the form shown in the drawings my device consists of a frame or base-plate 1 having a pair of uprights 2—2 mounted at its ends near its back side. A vertically movable carriage 3 of any suitable form or construction is provided near the front of the machine with a rigid arm 4 at each end, each extending toward the rear of the machine and pivotally engaging the upper end of the uprights 2 at its free end as at 5 to control the transverse position of the carriage. As shown the carriage comprises a front bar 6 formed integrally with, or rigidly attached at each end to, ends of the arms 4—4. A pair of substantially parallel and rigidly connected bars 7 and 8 also extend between and are pivotally attached at their ends as at 4'—4' to the arms 4—4. These bars 7 and 8 are maintained in position one directly above the other in any suitable manner. As shown a tubular part 7' is rigidly secured to the bars 7 and 8 projecting slightly below the bottom of the bar 8 and a pin 8' is rigidly secured to the baseplate 1 with its upper end extending into, and snugly fitting the lower end of the part 7' and accurately guiding the same. The bars 7 and 8 are each preferably provided with a series of openings 9 arranged in vertical alinement to receive the shanks 10 of the keys 11 to accurately hold them in position and permit of their independent vertical movement. As shown a second series of openings 12 is also provided in the bar 8 arranged to correspond with the openings 9 to receive an arm 14 upon each key shank positioned substantially parallel thereto to more accurately hold the shanks in position and prevent their rotation when in operation. As shown a helical spring 15 is provided upon each arm 14 with one end of each spring engaging the part 16 between the shank 10 and arm 14 and the opposite end bearing upon the plate 8 to normally maintain each key at the upper limit of its movement in relation to the carriage 3 with the upper part 16 of the offset portion of the key shank engaging the bar 7. A bar 17 also extends between the arms 4 and is pivotally attached near its lower edge to an ear 18 near each end of the bar 8. In the preferred form shown the bar 17 is L shaped in cross section. The portion of bar 19 is positioned substantially parallel to the bar 6 and the portion 20 at the upper edge of the vertical part 19 extending toward the key shanks with its edge adapted to engage a recess 21 formed in each shank so that when a key is depressed it will rock the bar 17 which will engage the notch 21 and lock the key in its depressed position. A spring 22 extends from the bar 17 to an ear 23 upon the arm 4 arranged to resiliently hold the bar 17 in engaging position.

In the preferred construction the several parts are so constructed and arranged that when a key is depressed the first movement of the key will be in relation to the carriage 3. The recess 21 is so formed that when a key is depressed the bar 17 after entering the recess will again be rocked forward sufficiently to disengage the bar 17 from any key previously depressed. A further pressure upon the key now depresses the carriage after which the key may be released and both the key and carriage will be held in this depressed position.

Any suitable means may be provided for limiting the downward movement of the carriage for each depression of a key. As shown a hook 24 is provided at each end of the bar 17 near its upper edge, adapted to engage a rack 25 so that when a key is depressed the forward movement of the bar 17 in addition to releasing any other key previously depressed also causes the hooks 24 to engage the rack 25. The rack 25 is preferably provided with a pair of longitudinal slots 28 adapted to coöperate with suitable projections upon an upright rigidly secured to the base plate 1 to slidably connect the rack to the upright. A spring 29 or other suitable resilient means extends from an ear or projection upon the rack to a part upon the upright and normally holds the rack at the upper limit of its movement. The length of the slots 28 limits the downward movement of the rack and also of the carriage when the hooks engage the same. Obviously however when each key is released the bar 17 moves into the recess 21 thereby disengaging the hooks 24 from the rack and permitting the racks to resume their normal position and thereafter a depression of the same or any other key 11 causes the hooks to again engage the rack and permit the carriage to again move downward the same distance.

Any suitable means may be provided to engage the carriage at each downward movement and prevent its retraction. In the form shown a series of teeth or notches 30 are provided near the end of the bar 6 and a pawl 31 adapted to engage each notch is pivotally mounted as at 32 upon a bracket 33 rigidly secured to the base-plate 1. In the preferred construction an arm 34 formed integrally with the pawl 31 extends at substantially right angles thereto and a spring 35 extends from the free end of the arm 34 to a suitable part upon the base 1 to normally hold the pawl 31 in engaging position. The teeth or notches 30 are spaced to correspond with the vertical movement of the rack 25 so that at each operative movement of the key the pawl 31 will engage the next succeeding notch or tooth 30.

Any suitable means may be provided for indicating the operation of the key 11. As shown a transversely movable frame 36 is provided, and a plurality of indicators 37, one for each column of figures, is rotatably mounted upon the frame 36. In the form shown a pair of posts 38 and 39 are mounted upon the bed plate 1, each with a suitable groove or recess 40 near the plate adapted to receive the edge of a projecting part of the bottom plate 41 of the frame. A pair of lugs 42 are provided near the front of the plate 1 and the bottom plate 41 is provided with a projecting part 43 at each end adapted to engage a horizontal slot 44 in each lug 42 to accurately support the frame in position and provide for its transverse movement. A pair of posts 45—45 are provided near the ends of the bottom plate 41 and a top plate 46 is mounted at the upper ends of the posts. The indicators 37 are preferably suitably formed disks each mounted near the upper end of a shaft 47 the ends of which are positioned in suitable bearings in the plates 41 and 46 respectively with suitable openings 48 through the plate 46 to show a portion of the surface of each indicator. Any suitable means may be provided for controlling the position of the indicators by the movement of the keys 11. In the form shown a plurality of vertical standards 50 are rigidly secured to the base plate 1 and extend through suitable openings 51 and 52 in the bottom plate 41. Each standard is provided with a series of transverse slots or grooves 53 and the upper ends of the standards are preferably connected by a bar 54 or other suitable means rigidly attached to each. In the preferred construction a bar formed of two parts 55 and 56 each provided with a slot 57 for each standard 50 is positioned in each slot, one bar being provided for actuating each indicator 37. Each bar is provided with a plurality of teeth 58 on one side of the part 55 adapted to coöperate with a pinion 59 mounted upon an indicator shaft 47 for that particular bar. In the preferred construction a plurality of series of teeth 60—61 and 62 are provided on the part 56 at its edge opposite the teeth 58. A lever 63 is pivotally mounted upon the part 56 as at 64 with one end arranged to engage a suitably formed tooth 65 upon the edge of the part 55. A spring 66 is provided to normally hold the lever 63 in engaging position. The free end of the lever 63 is offset laterally slightly and extends along the edge of the part 55. An arm 68 is also pivotally attached to the part 55 at one end and the opposite end engages a suitable slot in the post 39. A spring 69 extends from each arm 68 to a vertical member 70 upon the base plate 1 arranged to normally hold each bar at the limit of its movement toward the member 70. A lateral projection 71 is also provided upon the part 55 and extends into a recess 72 in the part 56 adapted to engage the ends of the recess to limit the longitudinal movement between the parts 55 and 56 while a hook 73 pivotally mounted upon the bar 8 of the carriage 3 as at 74 is arranged to engage a tooth 75 upon each of the parts 56 of the rack bar to normally hold the bars at the limit of their movement from the member 70. The series of teeth 60 upon the part 56 of the bar are provided to coöperate with the keys to control the longitudinal movement of the bar and thereby the operation of the respective indicators. In the preferred construction I provide nine teeth in the series, arranged to coöperate with the several keys 11 from zero to eight inclusive—for the number nine key, requiring the maximum movement of the bar, I merely form the slots 57 to correspond with the movement of the bar required.

In the preferred construction each key shank is provided with a projecting wing or stop 76 so arranged that when a key is depressed the wing 76 will be positioned in the path of the teeth 60. The position of the key 11 and the teeth 60 are so arranged that for the zero key a very slight, practically no movement of the bar is permitted. When the number one key is depressed the bar will move a single unit of distance or sufficient to move the indicators from one figure to the next. When the number two key is depressed the bar will move two units of distance or double the distance traveled for the number one key before the tooth 60 engages the wing 76 and so on up to the eight key for which the bar moves eight units of distance. The ninth key however is not provided with a wing 76 but the slots 57 are of sufficient length to permit the bars to move nine units of distance. When thus constructed it is obvious that the first or initial movement of each key merely depresses the key upon the carriage partially rotating the bar 17 and causing the hooks 24 at each end of the bar to engage the racks 25. The further depression of the key now forces the carriage 3 downward to the end of the movement of the plates 25 thus permitting the hook 31 to engage the first notch 30 upon the carriage. This movement also carries the hook 73 downward sufficiently to disengage it from the tooth 75 upon the upper rack-bar. When this occurs the spring 69 for that particular rack-bar moves the bar longitudinally until one of the projecting teeth 60 engages the wing 76 upon the key depressed thus arresting the movement of the bar and the indicator coöperating therewith. It should be particularly noted that with the carriage in its uppermost position any key depressed will always coöperate with the upper or first rack-bar and the upper rack-bar always and under every condition coöperates with the first indicator or the indicator farthest to the right. After a key has been operated and the carriage once depressed all of the keys will coöperate with the second rack-bar or the one next the top and this rack-bar will control the movement under all conditions of the second indicator or the one next to the left of the first indicator operated and so on, all of the keys coöperate with the particular rack-bar corresponding to the position of the carriage and each rack-bar actuates its own special indicator and no other. It is obvious, however, that with the parts formed as above described, if another key is now depressed the forward movement of the bar 17 would release the key previously depressed and thus permit the rack-bar engaging the key to finish its maximum travel. To obviate this difficulty a lateral projection 77 is provided at the lower end of each wing 76 so that when a tooth 60 engages the wing the projection 77 will extend below the tooth thus preventing the escape of the key when released by the movement of the bar 17. When the next key 11 is depressed the operation is substantially repeated the key is first depressed in relation to the carriage, moving the bar 17 forward disengaging the same from any key previously depressed after which the downward movement of the carriage permits the previously depressed key to return to its normal position and releases the next rack-bar thus operating the next indicator. One of the teeth 60 upon the rack-bar released engages the wing 76 of the key depressed thus accurately limiting the movement of the rack bar. This movement also brings into service the series of teeth 61, these teeth are formed by ten lateral notches 78 in the edge of the part 56. The several notches are accurately spaced to correspond with the ten positions of the rack-bar when coöperating with the ten keys. Each notch is of sufficient size to receive the edge of a vertical member 80 rigidly secured to the carriage 3 and arranged to engage and positively lock the several rack-bars successively as the carriage 3 descends, thus preventing the possibility of their further movement of the rack-bar or the indicator actuated thereby. Any suitable means may be provided to reset the mechanism without disturbing the position of the indicators. In the form shown a fixed lock 81 is rigidly secured to the upper end of the posts 38 and 39 with a substantially vertical portion 82 having a fixed tooth 83 or other suitable means rigidly secured thereto for each indicator, adapted to coöperate with the pinion 59 to rigidly hold the same in position. In the preferred construction the teeth 83 are positioned in close proximity to the teeth of the pinions 59 and so arranged that when the frame 36 is moved laterally each pinion will be engaged by a tooth 83 before it is released from the teeth 58. A further movement of the frame however entirely disengages the pinion from the teeth 58 after which the carriage 3 is released and the several rack-bars are returned into operative position to be engaged by the hook 73, after which the frame 36 is again moved forward to bring the pinions into engagement with the teeth 58 upon their respective rack-bars again and thereafter release them from the teeth 83.

Figure 1:
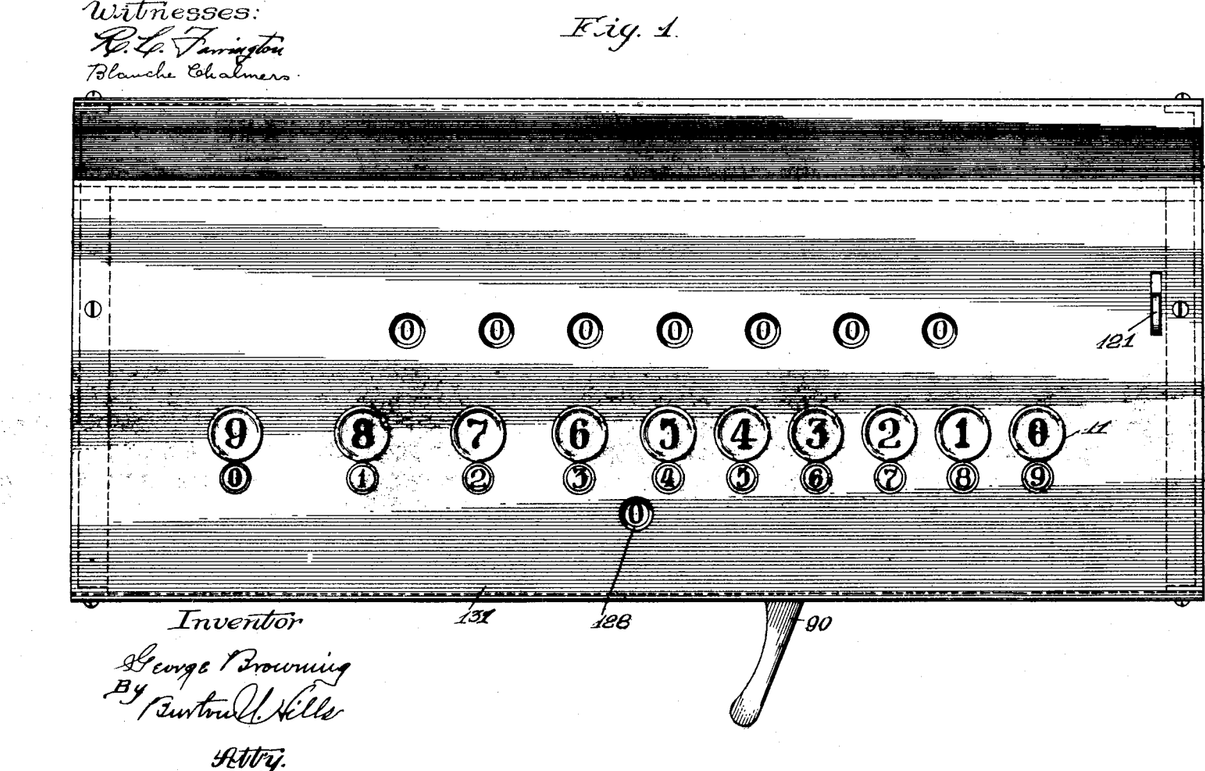
Figure 1 is a plan view of my device.
Figure 2:
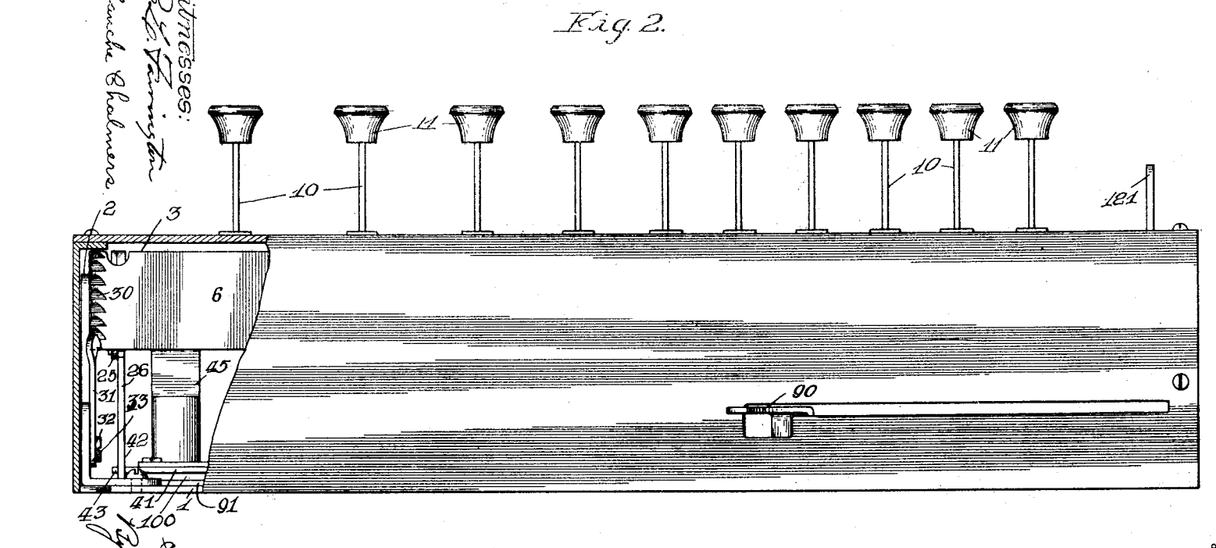
Fig. 2 is a front elevation of the same with parts removed and broken away to more clearly show the construction.
Figure 3:
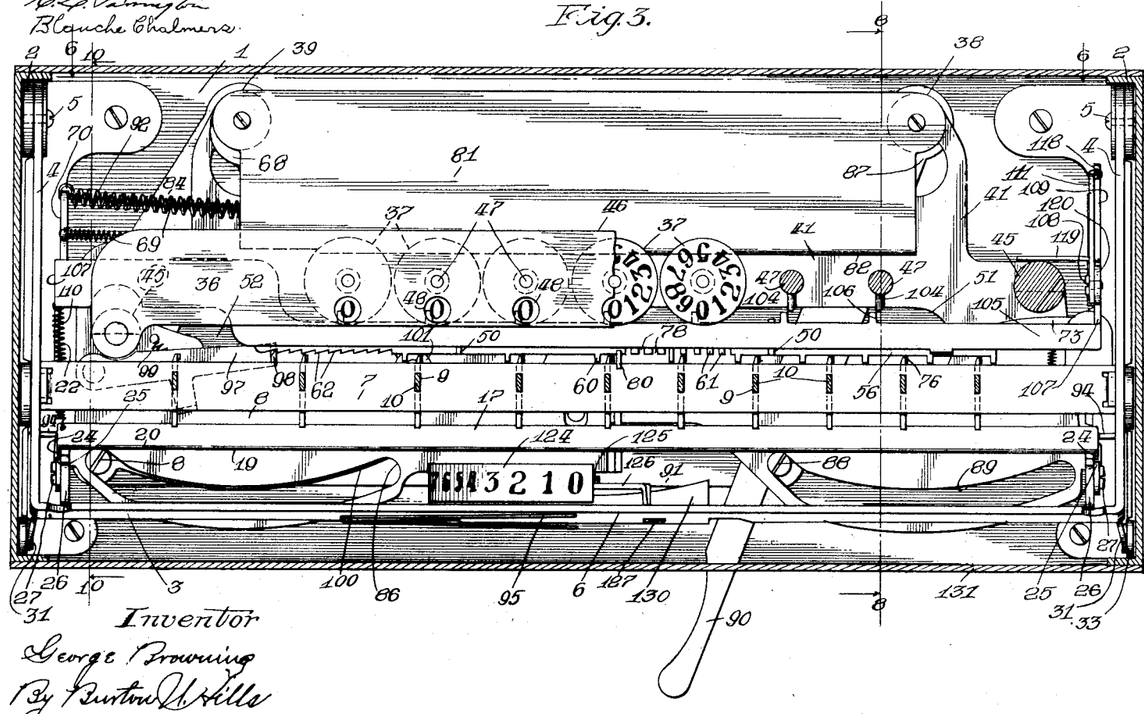
Fig. 3 is a section taken substantially on line 3—3 of Fig. 6.
Figure 4:
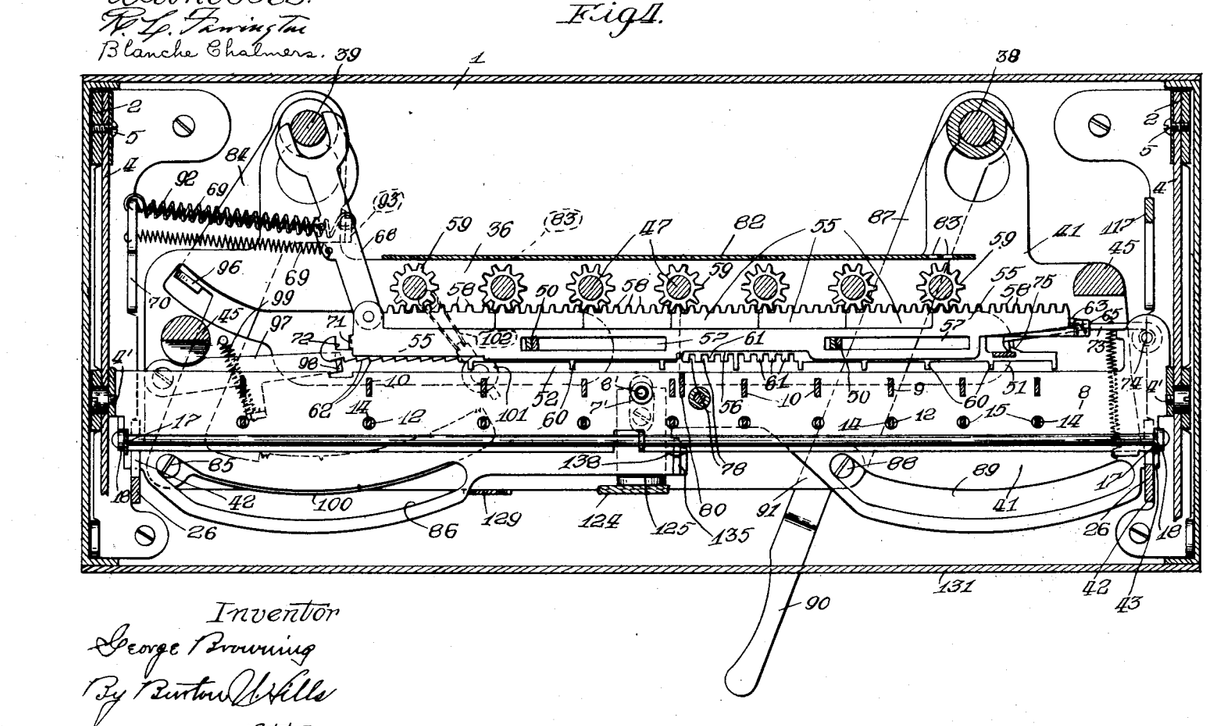
Fig. 4 is a section taken substantially on line 4—4 of Fig. 6.
Figure 5:
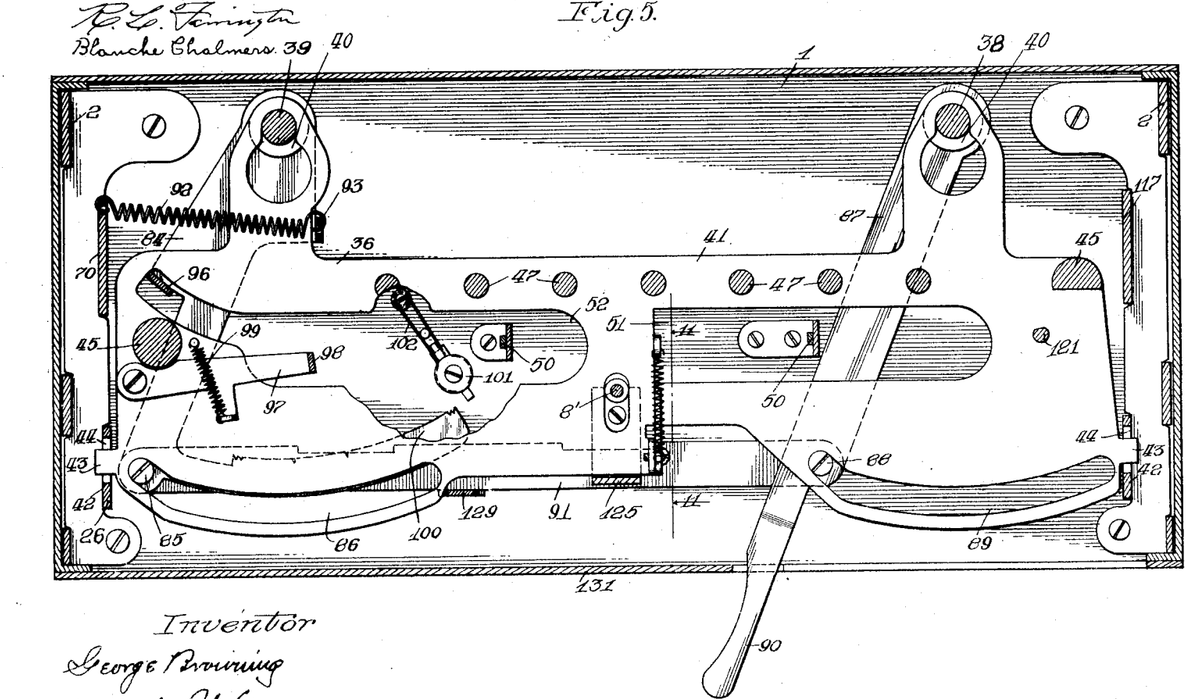
Figure 6:
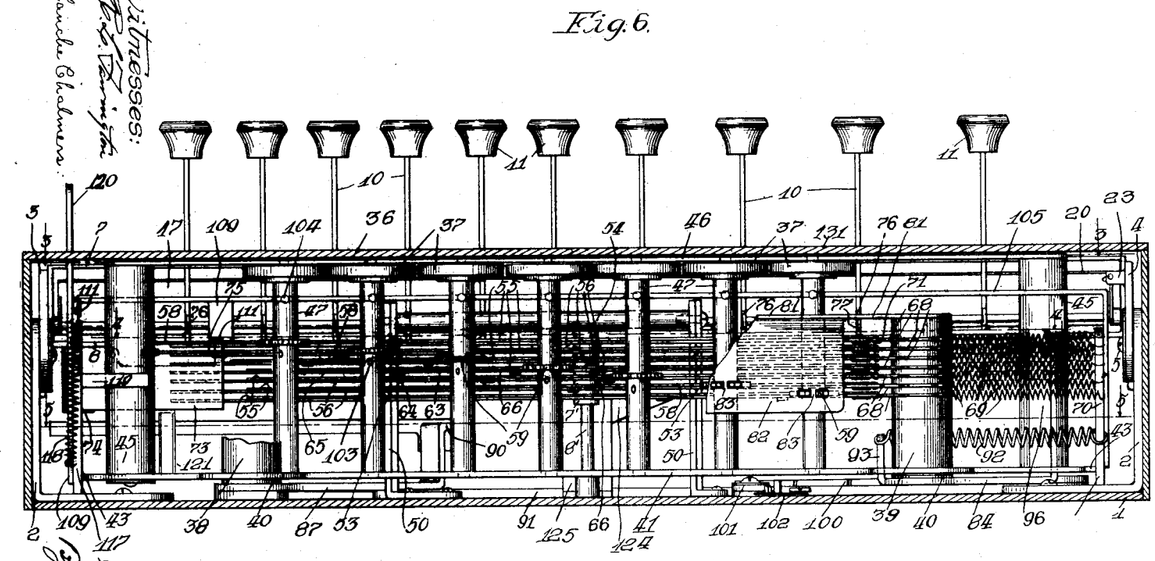
Fig. 6 is a section taken substantially on line 6—6 of Fig. 3.
Figure 7:
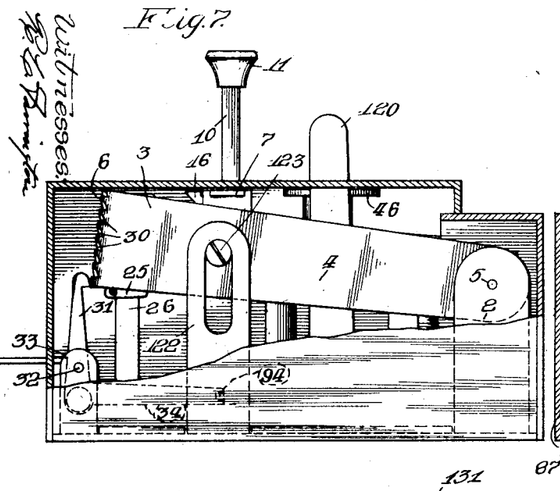
Fig. 7 is an end elevation of my device with a portion of the frame removed to more clearly show the construction.
Figure 8:
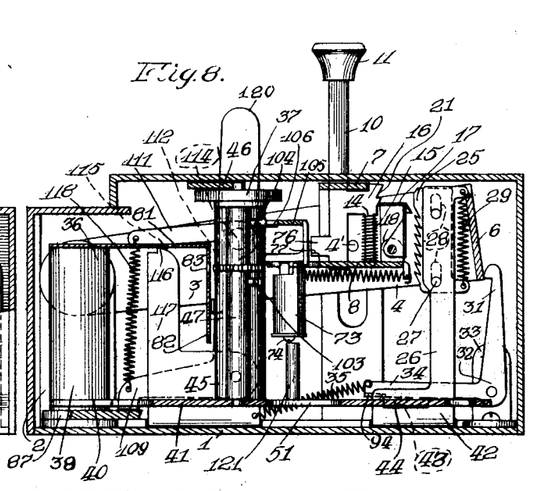
Fig. 8 is a section taken substantially on line 8—8 of Fig. 3.
Figure 9:
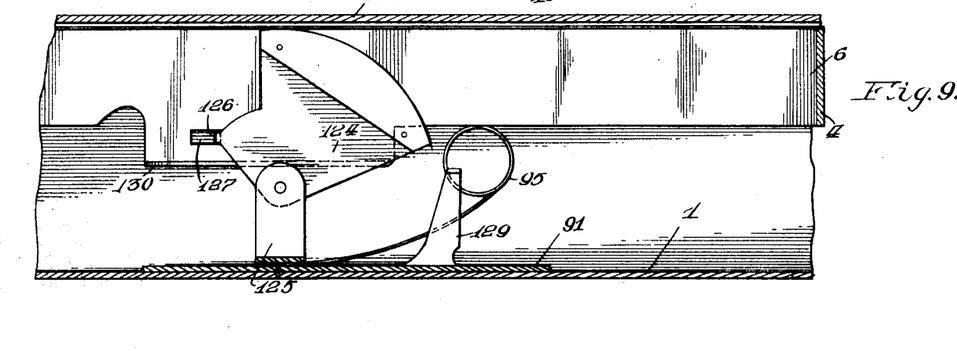
Fig. 9 is a fragmentary section taken substantially on line 9—9 of Fig. 3.
Figure 10:
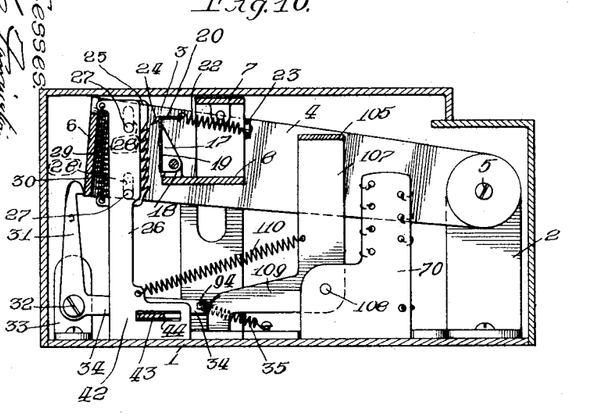
Fig. 10 is a section taken substantially on line 10—10 of Fig. 3.
Figure 11:
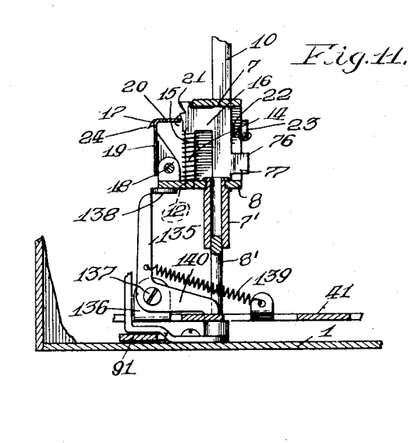
Fig. 11 is a section taken substantially on line 11—11 of Fig. 5.
Figure 12:
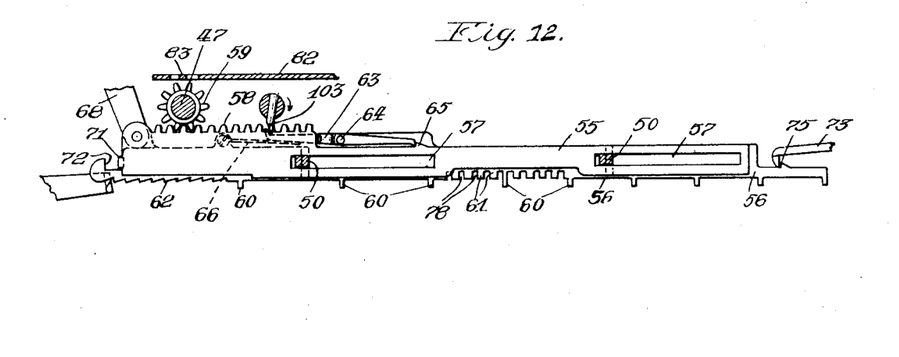
Fig. 12 is a detail showing the actuating mechanism for a single indicator detached from the remainder of the machine.

Any suitable means may be provided for producing the lateral movement of the frame 36, releasing the carriage 3 and returning the rack-bars into operative position. In the form shown an arm 84 is pivotally mounted at the lower end of the post 39 below the plate 41 and provided with a projecting stud or roller 85 adapted to engage a cam groove 86 upon the plate 41. An arm 87 is also pivotally attached to the post 38 and provided with a stud 88 or other suitable means adapted to engage a cam groove 89. A bar 91 connects the free ends of the levers 84 and 87 so that a movement of one will cause a corresponding movement of the other. The arm 87 is preferably provided with a projecting part or handle 90 for manually moving the arms 84 and 87 and a spring 92 extends from an upturned part 93 upon the lever 84 to the member 70 adapted to normally hold the levers at the limit of their movement toward the member 70 as shown in Fig. 5 in the drawings. The grooves 86 and 89 are so formed that the first movement of the handle 90 and arms 84 and 87 will cause the plate 41 forming part of the carriage 36 to recede thus causing the pinions to engage the lock as hereinbefore described. This movement also causes the parts 43 upon the plate to engage a suitable part, such for example, as the lateral projection 94 upon each arm 34 of the hook 31. The projections 94 are each provided with a cam shaped face positioned in the path of the part 43 so arranged that when the plate 41 is retracted the parts 43 engage the projections 94 and thereby raise the free end of each of the levers 34 thus disengaging the hooks 31 from the teeth 30 and releasing the carriage 3 which immediately is returned to its normal position by a spring 95 or other suitable means extending from the bar 6 to the base plate 1. A finger 96 is also provided upon the arm 84 adapted to engage each arm 68 and force the rack-bars into their operative position each time the handle 90 is operated.

In the preferred construction an arm 97 is pivotally mounted upon the plate 41 with a vertically projecting part 98 adapted to engage any of the teeth 62 upon the rack-bar to temporarily hold the several bars in position after the carriage 3 is released and returns to its normal position and until the finger 96 engages the several arms 68. A spring 99 or other suitable resilient means connects the arm 97 to the plate 41 and normally holds the part 98 in engaging position. In the form shown also a segment 100 is provided at the free end of the arm 84 adapted to coöperate with a pawl 101 to prevent a partial operation of the handle 90. As shown a spring 102 coöperates with the pawl 101 so that after the initial movement of the handle 90 the pawl will engage the segment 100 and prevent a retraction of the handle until it has been moved to the limit of its movement. At this point the pawl 101 escapes from the end of the segment 100 adjacent the arm 84 and as the parts begin their return movement actuated by the spring 92 the pawl again engages the segment and prevents a second operation of the handle 90 until it has returned to its normal position thus preventing errors or derangement of the mechanism by a partial movement of the handle 90. Obviously when thus constructed an operation of the keys after the mechanism has been reset will move the indicators to add the amount indicated by the first operation of the keys to that indicated by the second and so on. It thus becomes necessary to provide means for carrying from one indicator to the next indicator to the left or higher order. For this purpose a finger 103 is provided upon each shaft 47 preferably positioned at substantially the height of the rack-bar for the next adjacent indicator to the left and the free end of the lever 63 is positioned in the path of the finger 103 so that when the finger engages the free end of the lever the opposite end will be forced out of engagement with the projection 65 thereby permitting the part 55 of the rack-bar to move forward under the influence of the spring 69 until the projection 71 upon the part 55 engages the outer end of the recess 72 upon the part 56. The distance moved by the part 55 when thus liberated accurately corresponds to the movement of the key or one unit and advances the indicator for that particular rack-bar one unit.

In the preferred construction means are also, provided to clear the machine, that is, to move all of the indicators regardless of their position into zero position. Any suitable means may be provided for this purpose, as shown a finger 104 is rigidly connected to each indicator and a bar 105 having a lateral projection 106 for each indicator adapted to engage the fingers 104' to position each indicator in the zero position is bent downward at its ends as at 107 and pivotally attached as at 108—108 to suitable lugs upon the base plate 1. A laterally projecting arm 109 is provided at each end of the bar 105 adapted to engage the base plate 1 to limit the lateral movement from the indicators of the bars 105 and a spring 110 extends from the upright portion 107 of the bar to a suitably fixed portion of the device to normally hold said bar at the limit of its movement away from said indicators.

In the form shown a bell-crank 111 and 112 is pivotally mounted as at 114 upon the part 107, the arm 111 of the bell-crank is provided with a tooth 115 adapted to coöperate with a projection 116 upon a member 117 rigidly secured to the base plate 1, so that, when the bar 105 is moved into position to bring the projections 106 into the path of the fingers 104 the tooth 115 will engage the projection 116 and hold said bar in position. A spring 118 extends from the free end of the arm 111 to the part 109 to resiliently hold the tooth 115 in engaging position.

In the preferred construction a lateral projection 119 is provided upon the arm 112 of the bell-crank extending into the path of one of the posts 45 so that when the frame 36 is moved to clear the machine the post 45 will engage the projection 119, thus operating the bell-crank 111—112 to disengage the tooth 115 from the projection 116 and permitting the bar to return to its normal position and thereby release the indicators.

In the preferred form shown a handle 120 is rigidly secured to the bar 105 for moving the bar to clear the machine as above described. In the preferred construction also a post 121 is rigidly secured to the plate 41 in position to engage the hook 73 when the frame 36 is moved laterally to clear the machine and force the hook 73 out of engagement with the several rack-bars sufficiently to prevent the possible engagement of the hook with any portion of the bars during the upward or return movement of the carriage 3.

Any suitable means may be provided for limiting the upward movement of the carriage 3 and for accurately steadying the same. In the form shown a pair of guards 122 are provided one at each end of the base plate 1 and rigidly secured thereto, each adapted to coöperate with a projection 123 upon the respective arms 4. Each projection extends into a suitably formed slot formed in one of the guards and is adapted to engage the end of the wall of its slot to limit the movement of the carriage.

In the preferred construction also suitable means are provided for indicating the position of the carriage and the last indicator operated by the depression of a key. For this purpose a segment 124 is pivotally mounted upon a lug 125 rigidly secured to the base plate 1. A finger 126 is rigidly secured to the segment 124 and extends into an opening 127 in the bar 6 so that each movement of the bar will produce a corresponding movement of the segment which is preferably provided with suitable figures or characters upon its face adapted to be observed through a suitable opening 128 in the frame 135. In the preferred form also a lug 129 is provided upon the bar 91 adapted to pass beneath a lateral projection 130 upon the bar 6 when the handle 90 is operated to reset the mechanism and the carriage 3 is at, or when released immediately rises to, the upper limit of its movement. If however for any reason the carriage fails to rise at the first movement of the handle 90 the lug 129 will engage the projection 130 and prevent any further movement of the arm until the carriage rises. To assist in raising the carriage the side of the lug 129 adjacent the projection 130 is inclined to serve as a cam to coöperate with the end of the projection 130 when forced against it and tend to lift the carriage.

In the preferred form also a finger 135 is pivotally mounted upon a lug 136 upon the plate 41 as at 137 adapted to coöperate with a plate 138 upon the bar 8 to prevent any depression of the carriage 3 after the frame has commenced its lateral movement at the commencement of the operation of the handle 90. A spring 139 or other convenient means is provided to normally hold the finger 135 in operating position and a lateral projection 140 is rigidly attached to the finger and adapted to bear upon the plate 41 to hold the finger just out of engaging position when the frame is at the forward limit of its movement.

Having thus described my improvement it is obvious that various modifications may be made in my device without departing from the spirit of my invention; hence I do not wish to be understood as limiting myself to the exact form or construction shown.

What I claim as new and desire to secure by Letters Patent is:

1. In a computing machine a vertically movable carriage and a plurality of keys mounted upon said carriage, each adapted to successively move said carriage a predetermined distance, in combination with means for successively limiting the movements of said carriage and means for locking the carriage in each position.

2. In a computing machine, a vertically movable pivotally mounted carriage and a plurality of keys mounted upon said carriage adapted to successively move said carriage a predetermined distance, in combination with means for limiting the successive movements of said carriage, and means for locking the carriage in each position.

3. In a computing machine, a vertically movable carriage and a plurality of independently movable keys mounted upon said carriage each adapted to successively move said carriage a predetermined distance, in combination with means for limiting the successive movements of said carriage and means for locking the carriage in each position.

4. In a computing machine a vertically movable carriage and a plurality of keys mounted upon said carriage, each adapted to successively move said carriage a predetermined distance, in combination with a movable stop for limiting the successive movements of said carriage and means for locking the carriage in each position.

5. In a computing machine, a vertically movable carriage and a plurality of keys mounted upon said carriage, each adapted to successively move said carriage a predetermined distance, in combination with means operable by the several keys for limiting the successive movements of said carriage and means for locking the carriage in each position.

6. In a computing machine a vertically movable carriage and a plurality of keys mounted upon said carriage, each adapted to successively move said carriage a predetermined distance, in combination with means normally out of operative position for limiting the successive movements of said carriage and means for locking the carriage in each position.

7. In a computing machine a vertically movable carriage and a plurality of keys mounted upon said carriage, each adapted to successively move said carriage a predetermined distance, in combination with means for limiting the successive movements of said carriage, mechanism common to the several keys for moving said limiting means into operative position, and means for locking the carriage in each position.

8. In a computing machine, a vertically movable carriage and a plurality of keys mounted upon said carriage, each adapted to successively move said carriage a predetermined distance, in combination with means for limiting the successive movements of said carriage, an indicator for showing the position of said carriage, and means for locking the carriage in each position.

9. In a computing machine a plurality of indicators, actuating means for each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage means corresponding with the position of said carriage, and mechanism for resetting the several parts after each series of movements of said carriage.

10. In a computing machine a transversely movable frame, a plurality of indicators mounted upon said frame, actuating means for each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage and mechanism for resetting the several parts after each series of movements of said carriage.

11. In a computing machine, a plurality of rotatable independent indicators, actuating means for each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage and mechanism for resetting the several parts after each series of movements of said carriage.

12. In a computing machine, a plurality of indicators, actuating means, comprising a movable bar coöperating with each indicator, a vertically movable carriage, and means for placing said carriage in a fixed position for each indicator, in combination with a plurality of keys mounted upon said carriage each adapted to operate said carriage and control the operation of the actuating means corresponding with the position of said carriage and mechanism for resetting the several parts after each series of movements of said carriage.

13. In a computing machine, a plurality of indicators, actuating means for each indicator, a pivotally mounted vertically movable carriage, and means for placing said carriage in a fixed position for each indicator, in combination with a plurality of keys mounted upon said carriage, each adapted to operate said carriage and control the operation of the actuating means corresponding with the position of said carriage and mechanism for resetting the several parts after each series of movements of said carriage.

14. In a computing machine, a plurality of indicators, actuating means for each indicator and a vertically movable carriage, in combination with a plurality of keys mounted upon said carriage, each adapted to operate said carriage and control the operation of the actuating means corresponding with the position of said carriage, means operable by the several keys for placing said carriage in a fixed position for each indicator and mechanism for resetting the several parts after each series of movements of said carriage.

15. In a computing machine, a plurality of indicators, actuating means for each indicator, a vertically movable carriage, and means normally out of engaging position for placing said carriage in a fixed position for each indicator, in combination with a plurality of keys mounted upon said carriage each adapted to operate said carriage and control the operation of the actuating means corresponding with the position of said carriage and mechanism for resetting the several parts after each series of movements of said carriage.

16. In a computing machine, a plurality of indicators, actuating means for each indicator, a vertically movable carriage, and means for placing said carriage in a fixed position for each indicator, in combination with a plurality of independently movable keys mounted upon said carriage, each adapted to operate said carriage and control the operation of the actuating means corresponding with the position of said carriage and mechanism for resetting the several parts after each series of movements of said carriage.

17. In a computing machine, a plurality of indicators, actuating means for each indicator, a vertically movable carriage and means for placing said carriage in a fixed position for each indicator, in combination with a plurality of keys mounted upon said carriage, each adapted to successively operate said carriage and control the operation of the actuating means corresponding with the position of said carriage and mechanism for resetting the several parts after each series of movements of said carriage.

18. In a computing machine, a plurality of indicators, actuating means for each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage, a fixed stop for rigidly holding said indicators, and mechanism for resetting the several parts after each series of movements of said carriage.

19. In a computing machine, a plurality of indicators, actuating means for each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage, mechanism for disengaging said indicators from said actuating means and thereafter resetting the several parts after each series of movements of said carriage.

20. In a computing machine, a transversely movable frame, a plurality of independent indicators mounted upon said frame, actuating means comprising a movable bar coöperating with each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage and mechanism for resetting the several parts after each series of movements of said carriage.

21. In a computing machine, a transversely movable frame, a plurality of indicators mounted upon said frame, actuating means for each indicator and a vertically movable carriage, in combination with a plurality of keys mounted upon said carriage, each adapted to operate said carriage and control the operation of the actuating means corresponding with the position of said carriage, means operable by the several keys and normally out of engaging position for placing said carriage in a fixed position for each indicator, and mechanism for resetting the several parts after each series of movements of said carriage.

22. In a computing machine a plurality of indicators, actuating means for each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage, a fixed stop for rigidly holding said indicators and mechanism for disengaging said indicators from said actuating means and moving the same into engagement with said stop and thereafter resetting the several parts after each series of movements of said carriage.

23. In a computing machine, a plurality of indicators, actuating means for each indicator, a vertically movable carriage, and means for placing said carriage in a fixed position for each indicator, in combination with a plurality of independently movable keys mounted upon said carriage, each adapted to successively operate said carriage and control the operation of the actuating means corresponding with the position of said carriage, a fixed stop for rigidly holding said indicators and mechanism for disengaging said indicators from said actuating means and moving the same into engagement with said stop and thereafter resetting the several parts after each series of movements of said carriage.

24. In a computing machine a plurality of indicators, actuating means for each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage, means for indicating the position of said carriage, and mechanism for resetting the several parts after each series of movements of said carriage.

25. In a computing machine, a plurality of indicators, actuating means for each indicator, a vertically movable carriage, and means for placing said carriage in a fixed position for each indicator, in combination with a plurality of keys mounted upon said carriage each adapted to operate said carriage and control the operation of the actuating means corresponding with the position of said carriage, means for indicating the particular indicator which will be operated by the depression of a key, and mechanism for resetting the several parts after each series of movements of said carriage.

26. In a computing machine, a transversely movable frame, a plurality of indicators mounted upon said frame, actuating means for each indicator, a vertically movable carriage, and means for placing said carriage in a fixed position for each indicator, in combination with a plurality of keys mounted upon said carriage, each adapted to operate said carriage and control the operation of the actuating means corresponding with the position of said carriage, a fixed stop for rigidly holding said indicators, means for indicating the position of said carriage, and mechanism for disengaging said indicators from said actuating means and moving the same into engagement with said stop and thereafter resetting the several parts after each series of movements of said carriage.

27. In a computing machine, a plurality of indicators, actuating means for each indicator, a vertically movable carriage, and means for placing said carriage in a fixed position for each indicator, in combination with a plurality of keys mounted upon said carriage, each adapted to operate said carriage and control the operating of the actuating means corresponding with the position of said carriage, a fixed stop for rigidly holding said indicators, means for indicating the particular indicator which will be operated by the depression of a key, and mechanism for disengaging said indicators from said actuating means and moving the same into engagement with said stop and resetting the several parts after each series of movements of said carriage.

28. In a computing machine a transversely movable frame, a plurality of indicators mounted upon said frame, actuating means comprising a movable bar coöperating with each indicator, a vertically movable carriage, and means for placing said carriage in a fixed position for each indicator, in combination with a plurality of keys mounted upon said carriage each adapted to operate said carriage and control the operation of the actuating means corresponding with the position of said carriage, means for indicating the particular indicator which will be operated by the depression of a key, and mechanism for resetting the several parts after each series of movements of said carriage.

29. In a computing machine, a plurality of indicators, means for actuating each indicator and a plurality of keys for controlling said actuating means, in combination with locking means common to the several keys adapted to engage each key when operated and maintain said key in operating position and means upon each key adapted to engage said actuating means to maintain said key in position when released by said locking means.

30. In a computing machine, a laterally movable frame, a plurality of indicators mounted upon said frame, means for actuating each indicator and a plurality of keys for controlling said actuating means, in combination with locking means common to the several keys adapted to engage each key when operated and maintain said key in operating position and means upon each key adapted to engage said actuating means to maintain said key in position when released by said locking means.

31. In a computing machine, a plurality of indicators, a resiliently operated rack-bar for actuating each indicator and a plurality of keys for controlling said actuating means, in combination with locking means common to the several keys adapted to engage each key when operated and maintain said key in operating position and means upon each key adapted to engage said actuating means to maintain said key in position when released by said locking means.

32. In a computing machine, a plurality of indicators, means for actuating each indicator, a movable carriage, and a plurality of keys mounted upon said carriage for controlling said actuating means, in combination with locking means common to the several keys adapted to engage each key when operated and maintain said key in operative position and means upon each key adapted to engage said actuating means to maintain said key in position when released by said locking means.

33. In a computing machine, a plurality of indicators, means for actuating each indicator, a vertically movable pivotally mounted carriage and a plurality of keys mounted upon said carriage for controlling said actuating means, in combination with locking means common to the several keys adapted to engage each key when operated and maintain said key in operative position and means upon each key adapted to engage said actuating means to maintain said key in position when released by said locking means.

34. In a computing machine, a plurality of indicators, means for actuating each indicator and a plurality of keys for controlling said actuating means, in combination with locking means comprising a pivotally mounted bar common to the several keys adapted to engage each key when operated and maintain said key in operating position and means upon each key adapted to engage said actuating means to maintain said key in position when released by said locking means.

35. In a computing machine, a plurality of indicators, means for actuating each indicator and a plurality of keys for controlling said actuating means, in combination with locking means common to the several keys adapted to engage each key when operated and maintain said key in operating position and a projection upon each key adapted to engage said actuating means to maintain said key in position when released by said locking means.

36. In a computing machine, a laterally movable frame, a plurality of indicators, means for actuating each indicator and a plurality of keys for controlling said actuating means, in combination with locking means common to the several keys adapted to engage each key when operated and maintain said key in operating position and means upon each key adapted to engage said actuating means to maintain said key in position when released by said locking means and means for moving said frame to lock each indicator in position and to disengage the indicators from said actuating means.

In testimony whereof, I have hereunto signed my name in the presence of two subscribing witnesses.

GEORGE BROWNING.

Witnesses:
BURTON U. HILLS,
BLANCHE CHALMERS.

Copies of this patent may be obtained for five cents each, by addressing the "Commissioner of Patents, Washington, D. C."